United States Patent [19]
Bloom et al.

[11] 3,953,872
[45] Apr. 27, 1976

[54] NOVEL PHOTOGRAPHIC FILM ASSEMBLIES

[75] Inventors: Stanley M. Bloom, Waban; James W. Foley, Andover; Nicholas S. Hadzekyriakides, Arlington, all of Mass.

[73] Assignee: Polaroid Corporation, Cambridge, Mass.

[22] Filed: Aug. 16, 1974

[21] Appl. No.: 498,057

Related U.S. Application Data

[63] Continuation-in-part of Ser. No. 399,321, Sept. 21, 1973, Pat. No. 3,877,045.

[52] U.S. Cl. ............................... 354/275; 354/86; 354/88
[51] Int. Cl.² ......................................... G03B 17/26
[58] Field of Search ................. 354/83, 84, 85, 86, 354/88, 275, 276

[56] References Cited
UNITED STATES PATENTS

| | | | |
|---|---|---|---|
| 3,651,746 | 3/1972 | Land | 354/83 |
| 3,748,983 | 7/1973 | Gold | 354/275 |
| 3,798,667 | 3/1974 | Land | 354/83 |

*Primary Examiner*—Monroe H. Hayes
*Attorney, Agent, or Firm*—John P. Morley

[57] ABSTRACT

A photographic film assembly which comprises a cassette; a supply of photographic film disposed within the cassette; a battery positioned within the cassette which includes one or more cells containing an aqueous electrolyte possessing an ionizable ammonium salt, and gas collector means consisting essentially of an absorbent carbon positioned within the cassette for capture of volatile effluvia liberated by the battery.

17 Claims, 4 Drawing Figures

NOVEL PHOTOGRAPHIC FILM ASSEMBLIES

CROSS REFERENCE TO RELATED DISCLOSURES

This Application is a continuation-in-part of U.S. Pat. application Ser. No. 399,321 filed Sept. 21, 1973 by S. M. Bloom, J. W. Foley and N. S. Hadzekyriakides and now U.S. Pat. 3,877,045.

BACKGROUND OF THE INVENTION

Part 1. The Field of the Invention

This invention relates to photography and more precisely, to photographic film packs or assemblies comprising a container holding self-developing film unit(s) integrated with an electrical power supply system.

Part 2. Description of the Prior Art

U.S. Pat. Nos. 3,705,542; 3,543,662; 3,543,663; 3,595,661 and commonly owned, copending U.S. Pat. application Ser. No. 399,321 filed Sept. 21, 1973 by S. M. Bloom, J. W. Foley and N. S. Hadzekyriakides and now U.S. Pat. No. 3,877,045 relate to photographic film packs comprising an enclosure containing self-developing film units integrated with a power supply system. Such film packs are presently employed exclusively in a photographic camera sold by Polaroid Corporation of Cambridge Massachusetts, U.S.A. under the trade name "SX-70".

Essentially, film packs described in those Patents and Application comprise an opaque enclosure containing a dark slide for covering an exposure station in a forward wall of the container, a stack of individual "self-developing" film units positioned behind the dark slide, means for urging the stack of film units towards the forward wall to position the uppermost film unit in the stack in the exposure station and an electrical power supply system for operating electrical mechanisms of a camera designed for using the pack.

When the film pack is inserted into the camera, the dark slide is removed through a withdrawal slot at one end of the enclosure to uncover the exposure station and the uppermost film unit is urged into position in the exposure station by the means mentioned before which usually involves a spring biased platen.

After exposure, the uppermost film unit is advanced, from the exposure station through the withdrawal slot into engagement with cylindrical rollers and processing of the exposed film unit is initiated as the unit is advanced between the rollers.

"Self-developing film" of such packs is sometimes described as an integral negative-positive film unit having as essential elements, a photosensitive element having a photosensitive system for providing a diffusion transfer image pattern, an image-receiving element, an opacification system and a rupturable container holding a processing composition. The elements are integrated with the unit so that the processing composition can be distributed within the unit to install a diffusion transfer image pattern in the image-receiving element and the pattern is viewable against a reflective background without separation. The film units are adapted for processing outside the camera since effective protection against further exposure is provided by way of the opacification system which in some integral negative-positive film units is integrated with the unit prior to exposure of the photosensitive system while in others, the opacification system is integrated with the unit after exposure. In the preferred integral negative-positive film units, the opacification system comprises a combination of light-absorbing dyes and a light-reflecting material or pigment and this combination is included in the rupturable container and distributed between the photosensitive and image-receiving elements after exposure. Further details relating to the integral negative-positive film units may be found in U.S. Pat. Nos. 3,415,644; 3,415,645; 3,415,646 and 3,647,437 among others.

As mentioned, the film packs of the present invention also include an electrical energy power source contained within the enclosure. Essentially, the power source comprises a battery of the type described in detail in U.S. Pat. Nos. 3,543,662; 3,563,805; 3,617,387 and 3,734,780 among others. Such batteries are flat or planar primary batteries of the LeClanche type including a zinc anode system, a manganese dioxide cathode system and an aqueous electrolyte system generally comprising an aqueous ammonium chloride, zinc chloride and usually a small amount of mercuric chloride. When the film pack is inserted into the camera, the battery integrated therewith is connected to the camera's electrical system to provide the electrical energy sufficient to operate any circuits of the camera which can include an automatic exposure control circuit, a flash mode circuit, film transport circuits and processing mechanism circuit among others. The output of the battery is designed to continue to supply the requisite energy until all film units in the pack are exposed and transported from the camera. At that time, the pack—containing the integral battery—is discarded.

Photographic film packs having an enclosure containing film units integrated with an electrical energy power source represent an important factor in successfully presenting to the public the distinctive features and advantages of the advanced photographic system involving the camera and film units described before. For example, one distinctive advantage of the integration of the battery and the film units involves the positive assurance that the power supply is replenished concurrently with the renewal of the film supply. Further, the integration of the power supply with the film unit permits storage of both the film and battery in the same package prior to use and optimum storage conditions can be controlled and maintained. For example, each film pack is normally hermetically sealed within lighttight, moisture proof packages and these packages can be stored under conditions designed to assure maximum reliability for the performance characteristics desired of the film unit and battery. Equally important, the integration of film units and battery is accomplished in a fashion that does not impose inordinate design constraints on the final film pack but instead permits the use of primary batteries which are low in cost and not incompatable with the disposable feature of the pack. Also the integration can be accomplished at acceptably low production costs by way of efficient, high volume, on-line production techniques.

On occassional instances, the above-described film packs have been found deficient in fully providing the desired performance characteristics. This deficiency has been attributed to incomplete or inadequate sealing of the battery components and such deficiencies unfortunately can occasionally occur in any production process despite the use of highly sophisticated techniques and equipment and stringent quality control programs specifically designed to eliminate or minimize such occurrences. In any event, it is believed that the deficient sealing permits volatile material generated in the battery such as gaseous ammonia, mercury or water to contact the film units within the pack. In turn, such gaseous products are believed to be capable of adversely affecting the photographic film characteristics and properties such as the film speed and balance shifts.

Commonly owned, copending U.S. Pat. application Ser. No. 399,321 now U.S. Pat. No. 3,877,045 mentioned before is directed to a solution for the problem posed by the evolution of gaseous products from batteries integrated with film units. Essentially, the solution presented involves the integration of gas collection means in the pack to capture gaseous effluents from the battery. In a particularly preferred embodiment, a metal salt adapted to form an amoniate is dispersed in a gas absorbant having an active surface area. The present invention provides another solution for effectively protecting film units positioned in a container with an energy source from any adverse effects that could occur by contact of the units with any gaseous material that may evolve from the energy source.

BRIEF SUMMARY OF THE INVENTION

The essence of the present invention resides in the discovery that a gas collector consisting essentialy of an absorbent carbon can effectively protect film units from adverse effects of gaseous materials that may be evolved from a battery which is positioned within the film pack also containing the film units. Additionally, the gas collector of the present invention can be integrated with the film pack in a surprisingly simple and convenient fashion without extensive modification of, or interference with existing high speed, online production techniques.

In its simplest form, the collector of the present invention can comprise an absorbent carbon retained in a porous container. However, in the preferred embodiment, the collector comprises a fiberous matrix having an effective amount of absorbent carbon dispersed therein. The especially preferred absorbent carbon is activated charcoal although other carbons providing properties similar to activated charcoal can be employed. As mentioned, the amount of absorbent carbon employed is an "effective amount" and accordingly, the precise amount employed can vary depending upon such factors among others as the particular absorbent carbon involved and the overall dimensions of the matrix-carbon collector employed. Suitable results, however, are obtained by employing a collector fabricated of paper having an activated charcoal dispersed therein where the amount of dispersed charcoal is between about 25 to about 40 pounds per 3000 square feet and the overall dimensions of the collector are about 2 inches × 1.5 inches × 10 mils. Collectors of the present invention provide distinct advantages in that they are inexpensive and easily assembled with other elements of the film pack without significant interference with high speed assembly processes presently employed in the fabrication of such packs. Other advantages of the present invention will be apparent from the following description of preferred embodiments thereof taken in connection with the attached drawings.

DESCRIPTION OF PREFERRED EMBODIMENTS OF THE INVENTION

Figure 1:
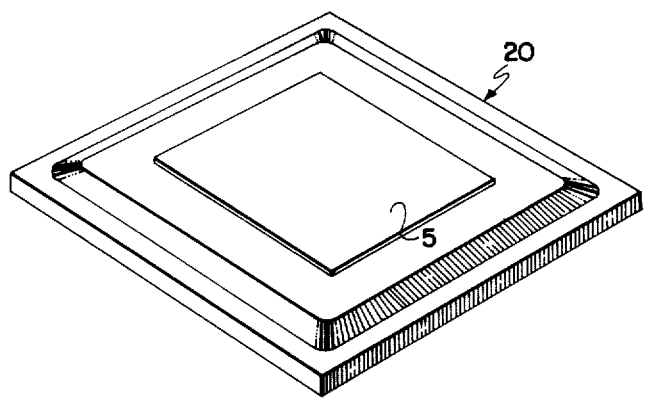
FIG. 1 is a perspective view of a planar battery of the present invention illustrating one manner of assembling the collector of the present invention with elements of the photographic film packs of the present invention.
Figure 2:
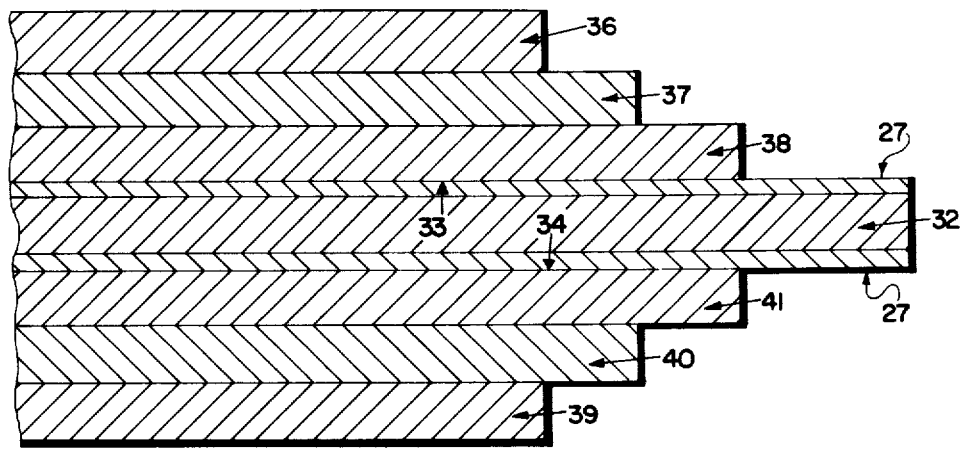
FIG. 2 is a partial cross-sectional view of a battery of FIG. 1 illustrating the essential elements of batteries employed in the photographic film packs of the present invention.

Referring first to FIGS. 1 and 2, a planar battery 20 is shown having collector 5 adhered to a surface of battery 20. Collector 5 comprises a fiberous sheet material having an effective amount of an absorbent carbon dispersed therein and collector 5 can be adhered to the surface of battery 20 by way of a suitable adhesive and preferably by way of a pressure sensitive adhesive, e.g., an acrylic or rubber based pressure sensitive adhesive. In the especially preferred embodiment, the surface of collector 5 not adhered to battery 20 has—or is treated to provide—a smooth surface to minimize dust attraction and/or collection thereon. Also, in the especially preferred embodiment, the collector comprises a paper sheet material having an activated charcoal dispersed therein. It should be apparent from the foregoing and following descriptions that battery 20 is assembled with other elements of the film pack so that collector 5 is positioned between battery 20 and film units assembled in the pack.

The preferred battery of the film packs of the present invention comprise a LeClanche electro chemical system including a zinc anode 38 (FIG. 2) and a manganese dioxide cathode 41. The aqueous electrolyte 27 generally comprises an aqueous ammonium chloride/zinc chloride (about 4:1) electrolyte and usually a small amount of mercuric chloride all dispersed in a polymeric binder. The dispersion of electrolyte 27 is applied to or impregnated in central portions of separator 32 and in contact with surface 33 of anode 38 and surface 34 of cathode 41.

Essential elements of the cells of battery 20 further include metallic sheet current collector 36. Metallic current collector 36 is fabricated of aluminum, lead or steel and is arranged in contact with polymeric current collector 37 which comprises a sheet of electrically conductive carbon impregnated, water vapor impermeable thermoplastic polyvinyl chloride film of the type sold under the trade designation "Condulon". Zinc anode 38 comprises active zinc material usually as a paste secured to polymeric current collector 37. Cathode, metallic sheet current collector 39 can be similar in material and construction to current collector 36 while cathode polymeric current collector 40 can be similar to polymeric current collector 37. Cathode 41 comprises an active cathode material such as a manganese dioxide, conductive carbon paste deposited on current collector 40. Edge sealing of the elements of the cell is preferably accomplished in accordance with the manner described in detail in commonly owned U.S. Pat. application Ser. No. 439,349 filed Feb. 4, 1974 by Robert M. Delahunt now U.S. Pat. No. 3,912,543.

Figures 3, 4:
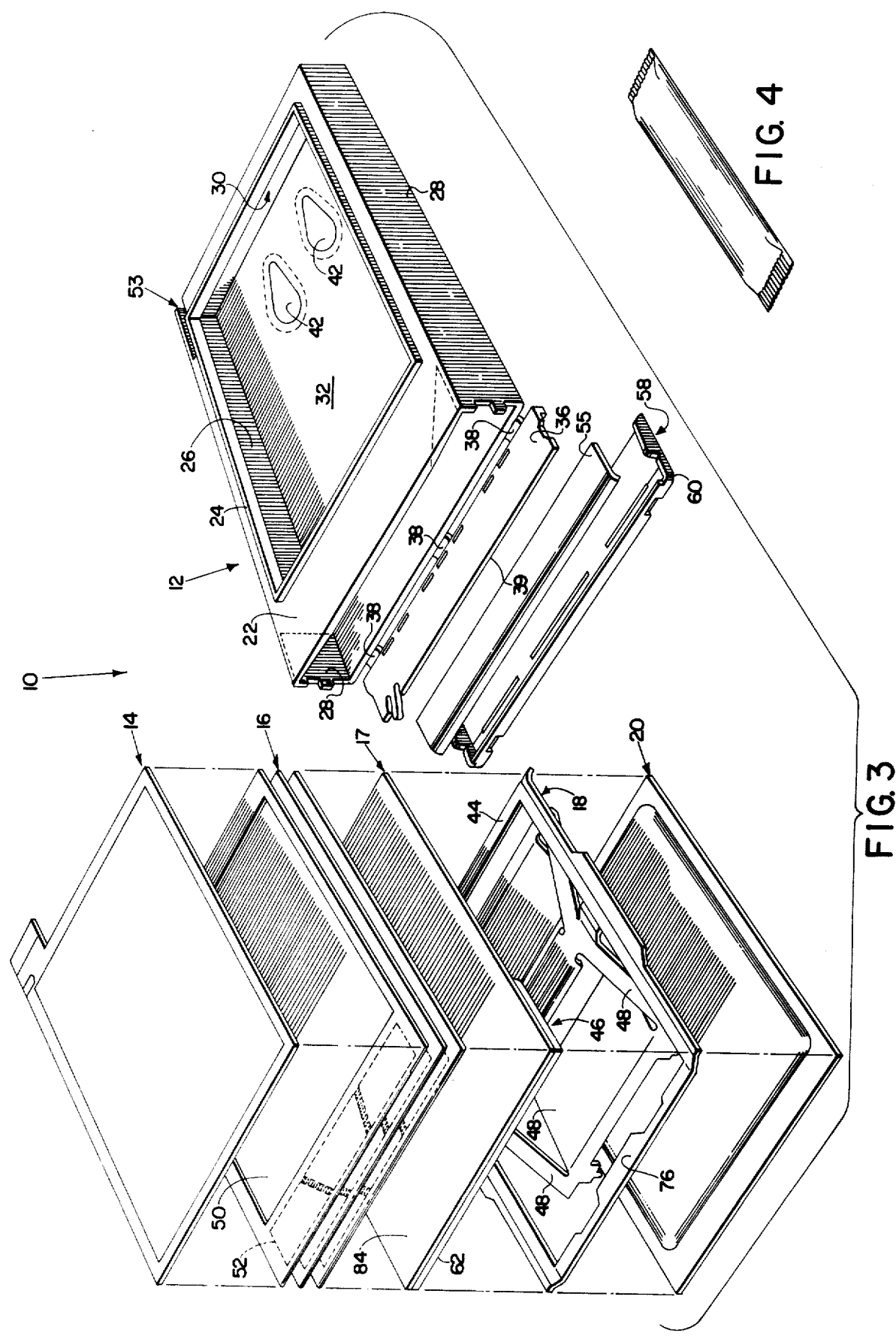
FIG. 3 is an exploded view of elements of the photographic film pack of the present invention showing the construction and arrangement of the elements of the film pack and further illustrating an alternative manner of assembling collectors of the present invention with elements of the film pack.
FIG. 4 is a perspective view of a collector of the present invention.

The components of a photographic film pack 10 to which the present invention pertains are shown in exploded fashion in FIG. 3 of the drawings. They include a box-like film container 12 and its contents, a dark slide 14, a plurality of self-developing film units 16, a resilient pad member 17, a film support member 18, and electrical battery 20.

Film container 12 is molded of an opaque thermoplastic material, such as polystryene, and includes relatively thin, substantially planar walls. A forward wall 22 includes a generally rectangular upstanding rib 24 which defines the bounds of a generally rectangular light-transmitting section or exposure aperture 26. Depending from three sides of forward wall 22, respectively, are a pair of side walls 28 and a trailing end wall 30 which serves to space a substantially planar rear wall 32 from forward wall 22.

The leading ends of forward wall 22, side walls 28, and rear wall 32 cooperate to define an elongated rectangular opening 34 at the leading end of container 12 through which the contents may be inserted. After insertion, a leading end wall 36 which is preferably coupled to the leading end or rear wall 32 by integrally formed flexible hinges 38, may be rotated 90° and joined to the leading ends of side walls 28 and rear wall 32 by any suitable method such as ultrasonic welding.

It will be noted that when leading end wall 36 is located in its closed position, its top edge 39 is spaced from the leading end of forward wall 22 such that an elongated withdrawal slot 40 is formed therebetween through which dark slide 14 and film units 16 may be sequentially removed from container 12.

The contents of film container 12 are preferably arranged therein in the stacked relation shown in FIG. 3. Battery 20 is substantially flat and is positioned over the interior surface of rear wall 32 such that two electrodes on the underside of the battery (not shown) are aligned with a pair of tear-drop shaped openings 42 in rear wall 32. When container 12 is operatively positioned in a suitable camera, a pair of electrical contacts mounted therein are adapted to extend through openings 42 for coupling battery 20 to the camera's electrical system.

Positioned over battery 20 is the film support member or spring biased platen 18. Member 18 preferably includes a generally rectangular platen or open support frame 44 dimensioned to support the peripheral margins of the rearwardmost film unit 16 in the stack. Integrally formed with frame 44 is a generally H-shaped center section 46 which includes resilient spring legs 48 that bear against container rear wall 32 and/or battery 20 to urge platen 44 upwardly.

Resilient pad member 17 is located between frame 44 and the most rearward film unit 16. The film units 16 are integral negative positive film units which are substantially flat and preferably rectangular. They preferably include a rectangular or square photosensitive image-forming area 50, which is surrounded by opaque margins and a rupturable pod or container 52, containing a fluid processing composition, located at the leading end of the film unit outside of the bounds of the image-forming area 50. As mentioned, details relating to suitable film units 16 can be found in U.S. Pat. Nos. 3,415,644; 3,415,645; 3,415,646 and 3,647,437 and the like.

Dark slide 14 is formed of any suitable opaque material such as cardboard, paper, or plastic and is initially positioned between the forwardmost film unit 16 and the interior surface of forward wall 22 to light seal exposure aperture 26 and opening 53. Once film container 12 is located at its operative position within a camera, slide 14 may be removed through withdrawal slot 40 in the same manner as the forwardmost film unit 16.

The film units 16 are arranged in stacked relation on top of resilient pad member 17 with their image-forming areas 50 facing towards the exposure aperture 26 in container forward wall 22 and their containers of fluid 52 adjacent end wall 36. Subsequent to the removal of dark slide 14, the forwardmost film unit 16 (closest to wall 22) bears against the interior surface of forward wall 22 and is in position for exposure to actinic radiation transmitted through exposure aperture 26.

It will be noted that after dark slide 14 is removed from container 12 through slot 40, the leading end of the forwardmost film unit 16, containing pod 52, is also aligned with withdrawal slot 40 at the leading end of container 12. Subsequent to exposure, the forwardmost film unit is adapted to be engaged by a film advancing mechanism 85 in the camera and moved out of container 12 through slot 40 in a direction substantially parallel to forward wall 22, for processing. Access for engaging the trailing end of the forwardmost film unit to move it forwardly through slot 40 is provided by an opening 53 located in forward wall 22 and the trailing end wall 30 of container 12.

In order to light seal withdrawal slot 40, container 12 is preferably provided with an opaque flexible sheet 55 which is secured at one end to an exterior surface of leading end wall 36 and is disposed in closing relation to slot 40.

This sheet forms a primary light seal for blocking light when container 12 is located within a camera. A secondary light shield for blocking slot 40 prior to inserting container 12 into the camera may also be provided in the form of an end cap member 58. Member 58 is coupled to leading end wall 36 and includes an end cap 60 which is initially positioned in closing relation to the primary light seal 55 with withdrawal slot 40 and may be pivoted to an open position in response to inserting container 12 into the camera. For details as to the construction and operation of end cap member 58, reference may be had to commonly owned copending application of Nicholas Gold, Ser. No. 213,989, filed on Dec. 30, 1971 now U.S. Pat. No. 3,748,984.

As mentioned in the discussion of FIG. 1, collector 5 can be adhered to the surface of battery 20 to position the collector between rear wall 32 (FIG. 3) and spring biased member 18 (FIG. 3). In this manner, collector 5 can be easily assembled with the other contents of the pack without any extensive modification of the high speed, on-line pack assembly procedures presently employed. In turn, collector 5 provides effective protection for the film units from adverse effects of gaseous effluents from battery 20 thereby improving the reliability and uniformity of the overall performance characteristics of the film packs.

Another method for assembling a collector of the present invention with the contents of the film pack without interference with present assembly procedures will be better understood by reference to FIG. 3.

As shown there, resilient pad member 17 preferably comprises a generally rectangular, parallelepiped shaped, resilient pad 62 and an overlying cover sheet 84. Resilient pad 62 is a compressible foam material adapted to be positioned on the leading end of frame 44 in underlying relationship to the container of fluid 52 of the most rearward film unit 16 in the stack. The cover sheet 84, over pad 62, serves to provide a low friction surface to facilitate the sliding motion of the most rearward film unit 16 over resilient pad 62 when the most rearward film unit is advanced through withdrawal slot 40.

The term "low friction" is used in the relative sense meaning that the coefficient of friction of the top surface of cover sheet 84 is lower than the coefficient of friction of material forming resilient pad 62.

In accordance with the practice of the present invention, overlying cover sheet 84 can function as an effective collector by employing as cover sheet 84 a fiberous sheet material, e.g., paper having an effective amount of absorbent carbon dispersed therein. Since cover sheet 84 is already a specified element of film packs comprising film units and a battery, an effective collector capability can be integrated with the pack with minimal modification of existing assembly techniques and components.

As mentioned, in its simplest form a collector of the present invention can comprise an absorbent carbon retained in a vapor permeable container. For example, a collector as shown in FIG. 4 comprising an activated charcoal retained in a vapor permeable paper envelope can be inserted between battery 20 and spring biased platen 18. However, the especially preferred collectors of the present invention comprise a paper sheet material having an effective amount of an activated charcoal dispersed therein. Paper sheet materials of this type are commercially available and used, for example, in the fabrication of cigarette filter elements. Such sheet materials can weigh between about 65–130 pounds per 3000 ft.$^2$ of material and can contain between about 25 to about 40 pounds of activated charcoal per 3000 ft.$^2$ of material. Collectors can be cut from such sheet materials and an adhesive applied to one surface to adhere the collector to battery 20 as shown in FIG. 1 or a collector cut from the sheet material can be used as cover sheet 84 as shown in FIG. 3. When used in either fashion it is preferred that any exposed surfaces of the collector be one which is smooth and which does not attract or collect dust or allow dispersed carbon to migrate from the sheet material. At the same time the surface cannot interfere to any appreciable extent with the absorption characteristics of the dispersed carbon. Accordingly, in the preferred embodiments, the sheet material is coated with polymeric materials so that any exposed surfaces of collectors fabricated therefrom will provide a surface of the desired smoothness and freedom from attraction or collection of dust and also be sufficiently sealed to retain the dispersed carbon without affecting its absorption characteristics. Suitable polymeric materials include among others vapor permeable, film forming polyacrylics, polycellulosics and polyacetates. An especially suitable polymeric material is a 1:1 mixture of polyacrylates sold by Rohm and Haas under the trade designations B-60A and B-65 which is applied to the sheet material to provide a coating of about three to about five pounds of polymeric film per 2000 sq. ft. of material.

From the foregoing, it will be appreciated that the invention described and claimed herein presents to the art a novel gas collector capability which is inexpensive and which can be easily integrated with film packs of advanced photographic systems to assure a high degree of reliability in the overall performance characteristics of such packs.

Since certain changes may be made in details offered in the above description without departing from the spirit and scope of the invention claimed, all matter contained in the description or shown in the drawings should be considered as illustrative and not in a limiting sense.

What is claimed is:

1. In a photographic film pack which comprises, in combination:
    a. a photographic film cassette including a withdrawal orifice positioned in a wall of the cassette through which a supply of photographic film is adapted to be selectively withdrawn;
    b. a supply of photographic film positioned in the cassette for selective withdrawal from the cassette through the orifice;
    c. a battery positioned in the cassette and including, in combination:
        i. an anode;
        ii. a cathode superposed substantially coextensive the anode;
        iii. a battery separator positioned intermediate and extending at least coextensive the facing surfaces of the anode and the cathode; and
        iv. an electrolyte disposed in contact with the facing surfaces of the anode and the cathode and including an ammonium salt; the improvement comprising gas collector means positioned in the cassette for capture of volatile effluvia exiting from the battery and wherein said collector consists essentially of an absorbent carbon.

2. A photographic film pack of claim 1 wherein said absorbent carbon is an activated charcoal.

3. A photographic film pack of claim 1 wherein said collector comprises an absorbent carbon retained in a porous container.

4. A photographic film pack of claim 1 wherein said collector comprises an absorbent carbon dispersed in a fibrous matrix.

5. A photographic film pack of claim 1 wherein said collector comprises a sheet material of an absorbent carbon dispersed in a fibrous matrix and one surface of said sheet material is provided with an adherent capability.

6. A photographic film pack of claim 1 wherein said collector comprises a sheet material of an absorbent carbon dispersed in a fibrous matrix and wherein at least one surface of said sheet material has the capability of resisting attraction or collection of dust and migration of carbon from said matrix.

7. A photographic film pack of claim 4 wherein said absorbent carbon is an activated charcoal.

8. A photographic film pack of claim 5 wherein said absorbent carbon is an activated charcoal.

9. A photographic film pack of claim 6 wherein said absorbent carbon is an activated charcoal.

10. In a photographic film pack assembly which comprises, in combination:
    a. a photographic film cassette adapted for enclosing a plurality of photographic film units arranged in stacked relationship and including a forward wall possessing a light-transmitting section to provide exposure of the forwardmost film unit and a withdrawal opening in one wall of the container permitting selective withdrawal of the film units following exposure thereof;
b. a plurality of integral negative-positive, diffusion transfer photographic film units disposed in stacked relationship within the cassette next adjacent the forward wall;
c. a battery positioned in the cassette and including, in combination:
   i. an anode;
   ii. a cathode superposed substantially coextensive the anode;
   iii. a battery separator positioned intermediate and extending at least coextensive the facing surfaces of the anode and the cathode; and
   iv. an electrolyte disposed in contact with the facing surfaces of the anode and the cathode and including an ionizable ammonium salt; the improvement which comprises gas collector means consisting essentially of an absorbent carbon positioned in the cassette intermediate the battery and the film units for capture of volatile effluvia exiting from the battery.

11. A photographic film assembly of claim 10 wherein the cassette includes spring means biasing the film units towards the forward wall and the battery toward the rear wall.

12. A photographic film assembly of claim 11 including first and second openings in the rear wall of the cassette, the first opening to permit conductor contact with the anode or cathode next adjacent the rear wall and the second opening to permit conductor contact with a conductor disposed in the container in contact with the electrode distal the rear wall.

13. A photographic film assembly of claim 11 including at least one opening in a wall of the cassette to permit conductor contact with each of the anode and the cathode.

14. A photographic film assembly of claim 10 wherein said absorbent carbon is an activated charcoal.

15. A photographic film assembly of claim 10 wherein said collector comprises an activated charcoal dispersed in a fibrous matrix.

16. A photographic film assembly of claim 10 wherein said collector comprises a sheet material of an activated charcoal dispersed in a fibrous matrix and one surface of said sheet material is provided with an adherent capability.

17. A photographic film assembly of claim 10 wherein said collector comprises a sheet material of an activated charcoal dispersed in a fibrous matrix and wherein at least one surface of said sheet material has the capability of resisting attraction and collection of dust and migration of charcoal from said matrix.

* * * * *